No. 818,396. PATENTED APR. 17, 1906.
W. TORRES.
FERTILIZER DISTRIBUTER.
APPLICATION FILED OCT. 4, 1905.
2 SHEETS—SHEET 1.
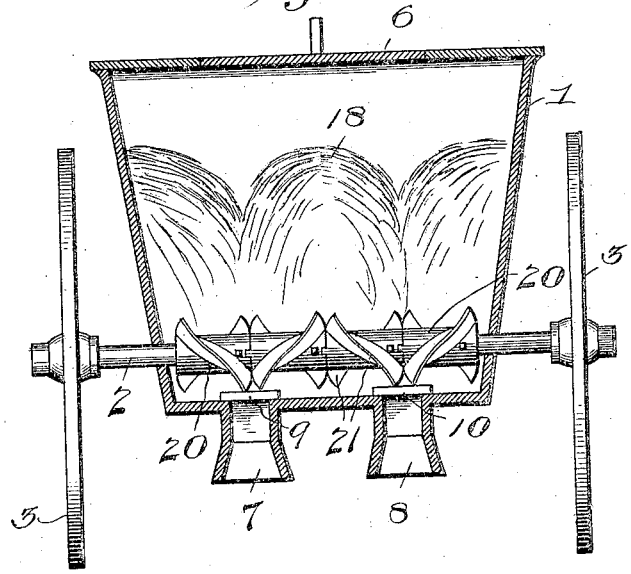
Fig. I.
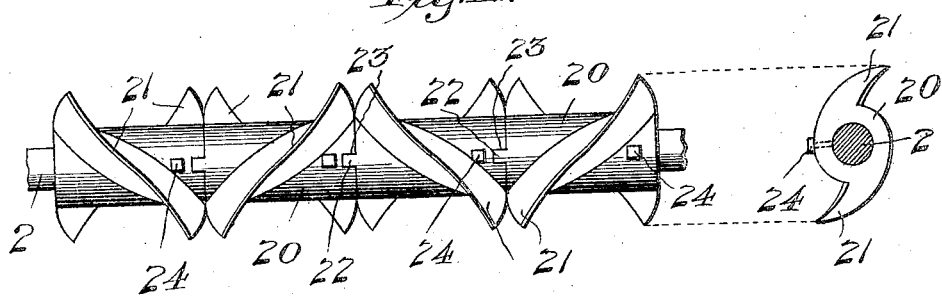
Fig. III.
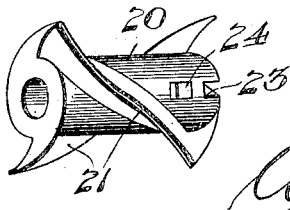
Fig. IV.
Witnesses
P. L. Mochener
M. H. Gates
Inventor
William Torres
By Joseph F. Atkins
Attorney No. 818,396. PATENTED APR. 17, 1906.
W. TORRES.
FERTILIZER DISTRIBUTER.
APPLICATION FILED OCT. 4, 1905.
2 SHEETS—SHEET 2.
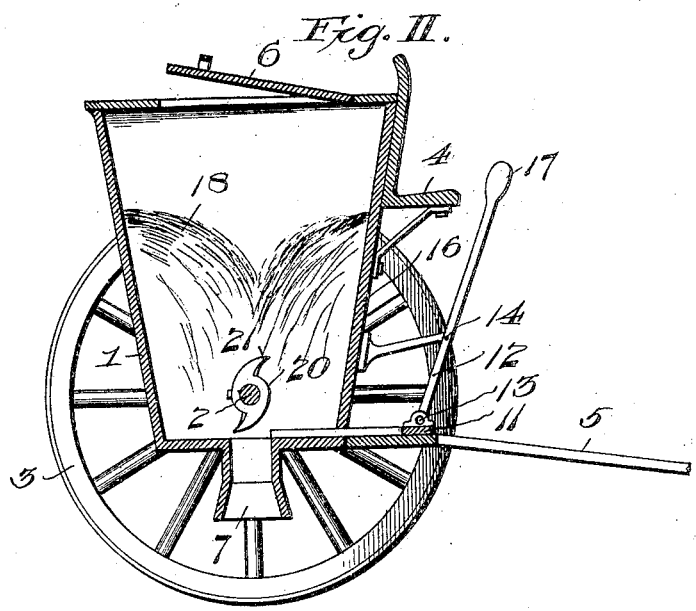
Fig. II.
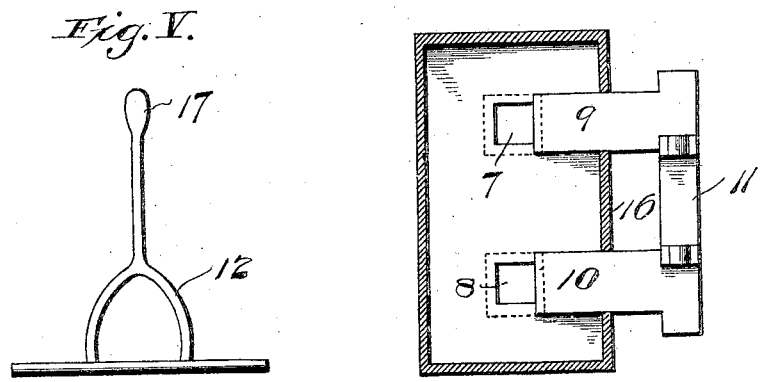
Fig. V.
Fig. VI.
Witnesses
T. L. Mockary
M. H. Gates
Inventor:
William Torres
By Joseph T. Atkins
Attorney.

UNITED STATES PATENT OFFICE.

WILLIAM TORRES, OF VACHERIE, LOUISIANA.

FERTILIZER-DISTRIBUTER.

No. 818,396.   Specification of Letters Patent.   Patented April 17, 1906.

Application filed October 4, 1905. Serial No. 281,316.

*To all whom it may concern:*

Be it known that I, WILLIAM TORRES, of Vacherie, in the parish of St. James, State of Louisiana, have invented certain new and useful Improvements in Fertilizer-Distributers, of which the following is a specification.

The object of my invention is to produce a vehicle for the transportation and distribution of cotton-seed meal or other material for agricultural purposes.

What constitutes my invention will be hereinafter specified in detail and succinctly set forth in the appended claims.

In the accompanying drawings, which constitute a part of this specification, Figure I is an end elevation of a preferred form of embodiment of my invention, showing the box or receptacle thereof in vertical section. Fig. II is a transverse vertical section of the subject-matter of Fig. I. Fig. III is a side elevation of the feeding mechanism of my machine detached, showing also in projection to the right thereof a vertical section of the same. Fig. IV is a perspective view of one of the sections of the feeding mechanism detached. Fig. V is a side elevation of the cut-off-actuating lever detached. Fig. VI is a top plan view of the bottom of the box or receptacle, illustrative of the cut-off mechanism therein.

Referring to the numerals on the drawings, 1 indicates the body, box, or receptacle of my apparatus, which may be made of any suitable shape, material, and construction and which is preferably a transverse oblong box, as illustrated. It is securely supported upon a revoluble axle 2, fixed to wheels 3, which support the structure and drive the axle. The box is preferably provided with a driver's seat 4 (see Fig. II) and shafts 5, one of which is shown in Fig. II. It is also provided with a lid 6 and with one or more discharge-chutes 7 and 8. The discharge from these chutes is regulated by a pair of gates 9 and 10, (compare Fig. VI with Figs. I and II,) which are united by a yoke 11. They are adapted to be actuated, as by a bifurcated lever 12, pivoted to the yoke 11, as indicated at 13, and to a stud-fulcrum, as indicated at 14 in Fig. II. The gates 9 and 10 work in apertures provided for them, respectively, in the front wall 16 of the body 1 and are adapted to be driven by oscillation of the handle 17, which is in easy reach of the driver's seat 4.

One of the chief features of my invention is found in the feeding mechanism, which for simplicity of construction, durability, and ease of operation I prefer to attach directly to the revoluble axle 2. The principle of my invention consists in the employment of a pair of screw feed members oppositely disposed, so as to discharge the contents of the box 1 toward a single point. In the drawings I show two points of discharge—to wit, the chutes 7 and 8—and consequently two pairs of screw feed members.

I am aware that screw feed mechanism has been used in this class of devices, but, so far as I am aware, they have all been so constructed as to tend in their operation of feeding to ultimately choke the machine, whereas by my device the working of my screw feed mechanism tends to not only keep the contents of the box stirred and loose, but to draw it evenly from the box and discharge it at the point desired. The operation of my screw feed upon the contents of the box is clearly indicated in the drawings in Figs. I and II, wherein the contents of the box 1 is indicated by the reference-numeral 18.

I prefer to construct my screw feed of a series of sections each complete in itself and interchangeable like for like. Each section consists of a cylinder 20, (compare particularly Figs. III and IV,) which being introduced into the lower part of the box 1 is adapted to receive the axle 2. Each cylinder is provided with one or more, and preferably two, propeller-like fins or blades 21. The cylinders 20 are assembled in pairs, so that their convergent fins 21, being obliquely disposed with respect to their cylinders, are, with respect to their counterpart, arranged convergently, as shown clearly in Figs. I and III. The cylinders are provided, respectively, with coupling members, preferably lugs 22 and sockets 23, by which they may be unitedly assembled upon the axle 2, upon which they are secured by suitable means—as, for example, screw-bolts 24, passing through apertures provided for them in the cylinders 20, respectively, and screwing into or against the axle 2—as clearly shown in Fig. III.

In operation the machine is drawn by an animal hitched between the shafts 5. The driver sits upon the seat 4 and by operation of the handle 17, by either hand or foot power, as preferred, may regulate the amount of material discharged through the chutes 7 and 8, if two chutes are employed, or may entirely shut off the discharge therefrom whenever desired.

What I claim is—

1. In a distributer, the combination with a receptacle provided with means for discharging material therefrom, of screw feeding mechanism within said receptacle composed of feeding-sections arranged to feed toward a common point of discharge.

2. In a distributer, the combination with a receptacle provided with means for discharging material therefrom, of screw feeding mechanism within said receptacle composed of a pair of feeding-sections arranged to feed toward a common point of discharge, and a single driving member for both feeding-sections.

3. In a distributer, the combination with a receptacle, an axle within the same, and wheels secured to and adapted to drive the axle, of a plurality of pairs of oppositely-acting feeding-sections secured to the axle, and, a common means for discharging the contents of the receptacle for each pair of feeding-sections.

4. In a distributer, the combination with a receptacle, axle within the same, and wheels secured to and adapted to drive the axle, of a plurality of pairs of oppositely-acting screw feeding-sections and a common point of discharge for each pair of feeding-sections, substantially as set forth.

5. In a distributer, the combination with a receptacle, axle within the same, and wheels secured to and adapted to drive the axle, of a plurality of cylinders severally secured to the axle, each cylinder being provided with a feeding fin or blade and each pair of cylinders having relatively convergent fins or blades, whereby discharge is made toward a common point of discharge provided in the receptacle.

6. In a distributer, the combination with a receptacle, a shaft within the same and wheels secured to and adapted to drive the shaft, of a plurality of cylinders provided respectively with sockets and lugs and means for securing them severally to the axle, each pair of cylinders being provided with convergent fins or blades disposed to feed toward a common point of discharge provided for them in the receptacle.

7. In a distributer, the combination with a receptacle provided with oppositely-acting screw feed mechanisms and a discharge common to both mechanisms toward which said mechanisms feed, of a gate, and a lever operatively communicating with the gate.

8. In a distributer, the combination with a receptacle provided with a plurality of oppositely-acting pairs of screw feed mechanisms and a plurality of discharge-chutes toward each of which a pair of said mechanisms feed, of a plurality of gates corresponding in number to that of the chutes, a yoke connecting the gates, and a lever operatively communicating with the yoke.

In testimony whereof I have hereunto signed my name in the presence of two subscribing witnesses.

WILLIAM TORRES.

Witnesses:
 JOHN WM. HEINS,
 JOS. B. DORNIER.